United States Patent [19]
Woodall

[11] 3,784,037
[45] Jan. 8, 1974

[54] GOLF BALL RETRIEVER
[76] Inventor: Leslie Woodall, 3560 Oulette Ave., Windsor, Ontario, Canada
[22] Filed: Oct. 17, 1972
[21] Appl. No.: 298,382

[52] U.S. Cl................................. 214/356, 56/128 R
[51] Int. Cl................................................ B60p 1/00
[58] Field of Search.................... 214/350, 353, 355, 214/356; 56/128 R

[56] References Cited
UNITED STATES PATENTS
2,365,540  12/1944  Fonken............................... 214/356
3,306,480  2/1967  Wysong.............................. 214/356

Primary Examiner—Albert J. Makay
Attorney—Willis Bugbee

[57] ABSTRACT

Golf balls lying at random locations on the golf driving range are picked up and deposited automatically in baskets mounted on a trailer forwardly of pick-up wheels, each of which consists of a pair of spaced resilient metallic discs, preferably of steel, with inwardly-converging peripheral portions. The wheels and baskets are mounted in multiple sets upon independent units of the trailer which can be coupled to one another, by pivoted rocking links and connected by converging draw bars to a junction plate drawn by a single tractor. The pickup wheels have pairs of discs with integral frusto-conical portions facing toward one another and spot-welded to one another to form a hub for each pickup wheel. These hubs are welded to shafts which are rotatably mounted in bearings on the trailer frame. The balls picked up and gripped between the opposing steel discs are ejected into the baskets by ball-expelling members extending therebetween and mounted on the trailer frame.

8 Claims, 5 Drawing Figures

PATENTED JAN 8 1974  3,784,037
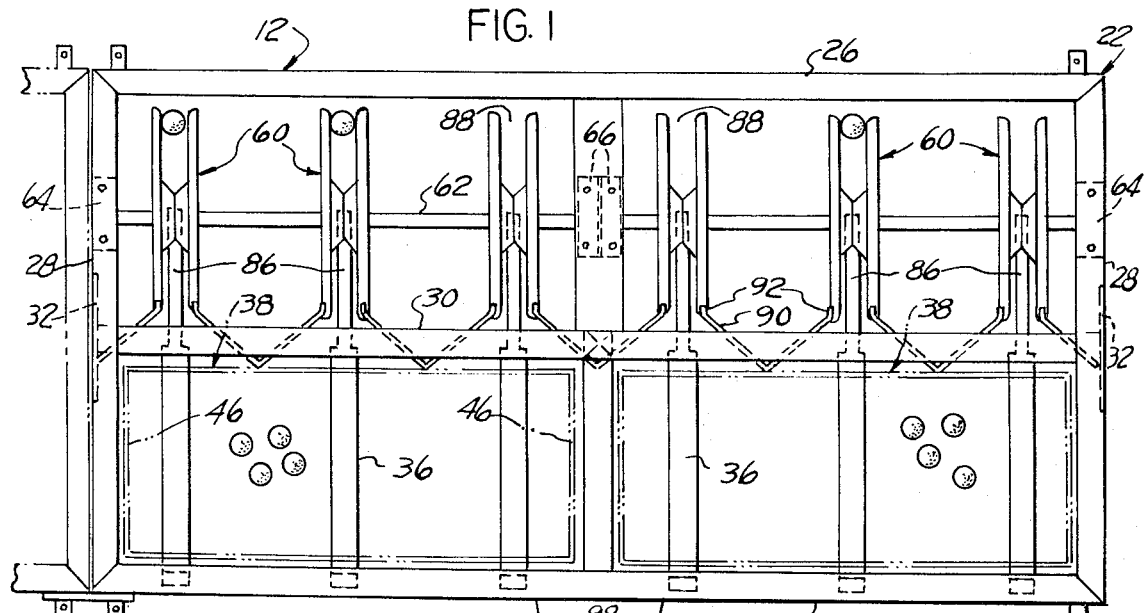
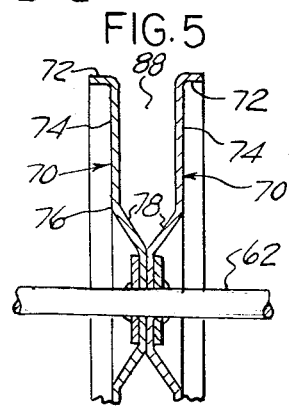
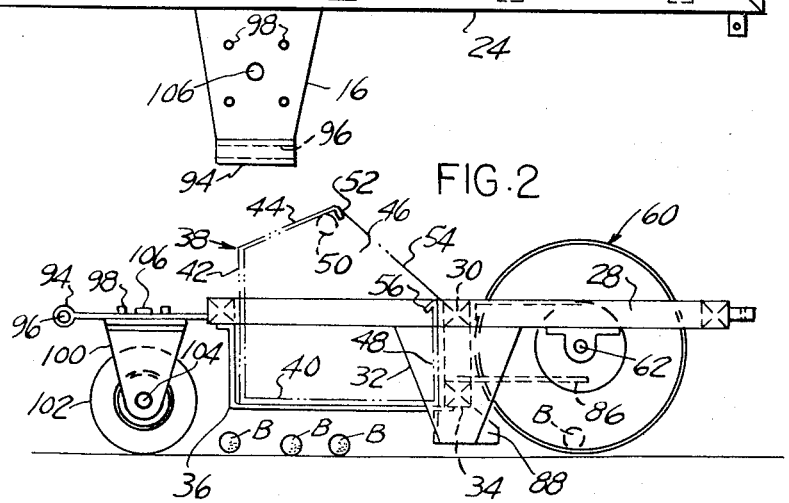
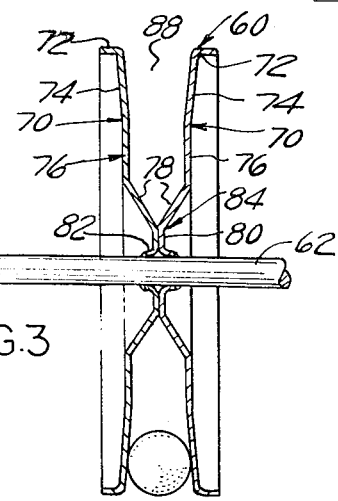
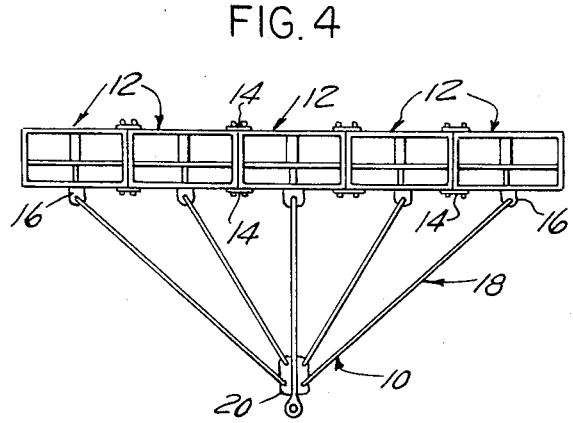

GOLF BALL RETRIEVER

SUMMARY OF THE INVENTION

The balls are picked up and gripped by ball pickup wheels each consisting of two resilient metallic discs, preferably peripherally flanged, with integral frusto-conical central portions extending toward one another into engagement and welded together to form a hub which in turn is secured, preferably by welding, to a rotary axle. The ball-expelling members mounted on the frame intercept the balls gripped between the discs of each wheel and deflect them into the baskets. V-shaped ball guide deflectors mounted on the frame between each pair of wheels direct the balls on the ground into the spaces between the discs of the wheels.

BACKGROUND OF THE INVENTION

Golf ball retrieving machines have hitherto been constructed employing rubber-faced or rubber-mounted ball pick-up wheels of complex and consequently expensive construction. One such machine is shown in the Woodall U.S. Pat. No. 2,812,871 of Nov. 12, 1957. Such use of rubber-faced pick-up wheels, however, also sometimes leaves disfiguring black markings on the balls, and rubber-mounted discs occasionally lose their resilience because of the eventual deterioration of the rubber hubs. The present invention eliminates such use of rubber. It also simplifies the construction of such a machine and employs simpler and less expensive parts which are either easily manufactured or are readily obtainable. This reduces not only the original cost of the machine but also the cost of repairs thereto in case of an accident, or replacement of parts when necessary.

In the drawing,

FIG. 1 is a top plan view of one section of a golf ball retriever, according to one form of the invention;

FIG. 2 is a side elevation of the golf ball retriever shown in FIG. 1;

FIG. 3 is a cross-section through one of the ball pickup wheels and axle, shown upon an enlarged scale;

FIG. 4 is a diagrammatic top plan view on a reduced scale showing how five of the sections shown in FIG. 1 are interconnected by pivoted rocking links and drawn through converging draw bars by a single tractor; and FIG. 5 is a view similar to the central portion of FIG. 3, but showing a modified wheel construction.

Referring to the drawings in detail, FIG. 4 shows diagrammatically a golf ball retriever, generally designated 10, consisting of a plurality of ball-retrieving units 12 pivotally connected to one another by rocking links 14. Each unit 10 has a coupling plate 16 connected by a draw bar 18 to a common junction plate or hitch plate 20. As all of the ball-retrieving units 12 are identical in construction, a single description is believed to suffice for all.

Each ball-retrieving unit 12 (FIGS. 1 and 2) is supported by a generally rectangular frame 22 conveniently formed of square steel tubing and including a pair of elongated front and rear members 24 and 26 interconnected by side members 28 welded or otherwise secured thereto. The side members 28 intermediate their ends are interconnected by upper intermediate members 30. Secured to and depending from each of the upper side members 28 is a bracket plate 32 of truncated triangular shape which supports one end of a lower intermediate member 34. Extending downward from the lower side of the front member 24 to the lower side of the lower intermediate member 34 are laterally-spaced parallel L-shaped basket-supporting bars 36 on which baskets 38 (FIG. 2) are removably mounted.

The baskets 38, which are shown in dashed dot lines in FIGS. 1 and 2, are preferably formed from expanded metal mesh and each has a bottom wall 40, a front wall 42, a forwardly-inclined top wall 44 extending approximately halfway over the top of the basket, and opposite end walls 46. A rear wall 48 extends approximately half way upward of the total height of the basket. The opposite end walls 46 are interconnected by a wooden dowel rod 50 beneath the down-turned flange 52 at the rearward edge of the top wall 44, forming a convenient handle to be grasped by the fingers and hands of the operator. This construction leaves an entrance opening 54 between the top edge flange 52 and the upper edge flange 56 of the rear wall 48 through which the retrieved balls are thrown from ground-engaging ball pick-up wheels, generally designated 60.

The pick-up wheels 60 are secured in laterally-spaced relationship to two rotary shafts 62 which in turn are rotatably mounted end-to-end in outer bearing blocks 64 and in inner bearing blocks 66 of a conventional design. The outer bearing blocks 64 are bolted or otherwise secured to the undersides of the frame side members 28. The inner bearing blocks 66 are bolted or otherwise secured to the underside of a strut 66 extending between and welded or otherwise secured to the midportions of the upper intermediate member 30 and the rear member 26. The members 30 and 26 are in turn welded or otherwise secured to the side members 28 which in turn are welded to the front member 24.

Each ball pick-up wheel 60 (FIG. 3) consists of a pair of discs 70 of circular outline having outwardly-projecting annular peripheral flanges 72 upon outwardly-flared peripheral portions 74 which proceed inward therefrom through radial intermediate portions 76 to frustoconical or deeply-dished central portions 78 inclined toward one another and terminating in parallel portions 80 spot welded to one another and having oppositely-directed flanges 82 on the inner edges thereof. The flanges 82, radial portions 80 and frustoconical portions 78 collectively form hubs 84, the flanges 82 of which are welded or otherwise secured to the shafts 62 at axially-spaced locations therealong.

Secured as by welding to the upper side of the lower intermediate member 34 in spaced parallel relationship to one another are cantilever-mounted ball-expelling bars 86 extending into the spaces or gaps 88 between each pair of wheel discs 70, terminating approximately beneath the shafts 62. Welded or otherwise secured to the lower side of the lower intermediate member 34 at laterally-spaced locations corresponding to the spacing of the ball pick-up wheels 60 are approximately V-shaped ball guides 90, the flanged rearward edges 92 of which terminate adjacent the peripheral flanges 72 of the wheel discs 70 so as to direct the balls B being picked up into the spaces or gaps 88 between the wheel discs 70. It will be understood that the separations of the peripheral disc portions 74 are slightly less than the diameter of the smallest golf ball B to be picked up, thereby causing the peripheral disc portions 74 to yieldingly grip the golf balls sufficiently to hold them in place until they encounter the ball-expelling bars 86 and are expelled thereby into the baskets 38. The coupling plate 16 is of truncated triangular shape with their rearward ends welded or otherwise secured to the mid-portions of the front frame member 24, and terminates at its forward end in a rolled tubular coupling portion 94 having a passageway 96 therethrough for the connection of the bent rearward ends of one of the draw bars 18. Bolted or otherwise secured as at 98 to the underside of the coupling plate 18 is the fork 100 of a rubber tired caster wheel 102 of conventional design mounted upon a horizontal wheel axle 104. The fork 100 is in turn rotatable around a vertical pivot 106.

In the operation of the golf ball retriever 10 of this invention, it will be assumed that five of the units 12 have been coupled to one another by the rocking links 14 and that they have also been connected by the converging draw bars 18 from their respective coupling plates 16 to the hitch plate 20 and that the latter has been coupled to a self-propelled towing machine, such as to a tractor. The operator then drives the tractor, with the golf ball retriever 10 in tow thereof over the golf driving range, picking up the balls B in their random locations as the retriever 10 is drawn back and forth over the entire range. Due to the rocking links 14 interconnecting the units 12, the latter adjust themselves to the contour of the terrain as the retriever 10 is drawn back and forth over the range.

The balls B are picked up by being deflected into the paths of the gaps 88 between the discs 70 of the pick-up wheels 60 by the V-shaped ball guides 88 (FIGS. 1 and 2) so that the balls B are gripped between the discs 70, which flex slightly around their hubs 84 because of the slightly greater diameters of the golf balls than the pick-up wheel gaps 88. In this manner the balls B become wedged between the discs 70 and are carried around therebetween until they encounter the ball-expelling members 86 by which they are deflected into the baskets 38 through the entrance openings 54 therein. When these baskets 38 become filled or the driving range has been completely covered by the retriever 10, the operator removes the baskets 38 and carries one in each hand by the dowel handles 50 to a location of ball storage whereupon the baskets 38 are replaced and the retriever 10 is ready to perform another ball-retrieving journey.

The modified ball pick-up wheel, generally designated 110, shown in FIG. 5, is of similar construction to the wheel 60 shown in FIGS. 1, 2 and 3, except in its central portion. There, instead of having the flanges 82 (FIG. 3), the parallel portions 80 terminate at the shaft 62 and are reinforced on their outer sides by washers 112 spot-welded thereto and in turn spot-welded at 114 to the shaft 62. This modification provides additional strength at the junction of the wheel 110 with the shaft 62. The same construction, except for using rivets through the washers 112 and wheel portions 80, may be employed when synthetic plastic wheels are used instead of sheet metal wheels.

I claim:

1. A golf ball retriever, comprising
   - a frame having means thereon for connection to a towing vehicle,
   - a shaft rotatably mounted on said frame transversely of said connection means,
   - a multiplicity of ball pick-up wheels mounted on said shaft for rotation thereon relatively to said frame,
     - each wheel including a pair of resilient metallic discs having peripheral portions spaced apart from one another by distances slightly less than the diameter of the smallest ball to be picked up,
     - said discs having dished central portions projecting toward one another and connected to one another to form hub portions engaging said shaft,
   - a ball receptacle mounted on said frame,
   - ball guides mounted between said wheels in ball-guiding relationship to the spaces between their respective discs,
   - and a ball-expelling member secured to said frame and projecting into the space between the discs of each wheel and positioned to intercept and expel balls therefrom into said receptacle.

2. A golf ball retriever, according to claim 1, wherein said peripheral portions of said discs are flared outwardly away from one another, said central portions being dished more deeply than the outward flaring of said peripheral portions.

3. A golf ball retriever, according to claim 2, wherein said discs have substantially parallel intermediate portions disposed between said peripheral portions and said central portions.

4. A golf ball retriever, according to claim 1, wherein said dished central portions are of approximately frusto-conical configuration.

5. A golf ball retriever, according to claim 4, wherein said dished central portions have substantially flat innermost ends, said ends being secured to one another in each wheel.

6. A golf ball retriever, according to claim 5, wherein said ends have oppositely-extending central flanges, and wherein said flanges are secured to said shaft.

7. A golf ball retriever, according to claim 6, wherein said ends are welded to one another, and wherein said flanges are welded to said shaft.

8. A golf ball retriever, according to claim 1, wherein said discs have flanges on their margins, said flanges of each pair of said discs in each wheel being directed axially away from one another.

* * * * *